(12) United States Patent
Ito et al.

(10) Patent No.: US 6,917,386 B2
(45) Date of Patent: *Jul. 12, 2005

(54) AUTO-FOCUS APPARATUS, FOCUS ADJUSTING METHOD, IMAGE CAPTURING APPARATUS AND IMAGE CAPTURING METHOD UTILIZING AN EMITTING DEVICE TO FOCUS AN IMAGE

(75) Inventors: Yujiro Ito, Kanagawa (JP); Susumu Kurita, Kanagawa (JP)

(73) Assignee: Sony Corporation, Tokyo (JP)

( * ) Notice: Subject to any disclaimer, the term of this patent is extended or adjusted under 35 U.S.C. 154(b) by 823 days.

This patent is subject to a terminal disclaimer.

(21) Appl. No.: 09/731,133

(22) Filed: Dec. 6, 2000

(65) Prior Publication Data

US 2001/0003465 A1 Jun. 14, 2001

(30) Foreign Application Priority Data

Dec. 8, 1999 (JP) .......................................... P11-348839

(51) Int. Cl.$^7$ .......................... H04N 5/232; G03B 13/34
(52) U.S. Cl. ....................................... 348/348; 396/123
(58) Field of Search .............................. 348/348, 345; 396/123; 356/3.09

(56) References Cited

U.S. PATENT DOCUMENTS

| | | | | |
|---|---|---|---|---|
| 4,470,681 A | * | 9/1984 | Johnson ....................... | 396/123 |
| 4,623,237 A | * | 11/1986 | Kaneda et al. ................. | 396/96 |
| 4,660,969 A | * | 4/1987 | Sorimachi et al. ......... | 356/3.01 |
| 5,006,700 A | | 4/1991 | Kosaka et al. | |
| 5,137,350 A | | 8/1992 | Misawa et al. | |
| 5,255,045 A | | 10/1993 | Nonaka | |
| 5,264,892 A | * | 11/1993 | Nonaka et al. ............. | 396/104 |
| 5,666,566 A | | 9/1997 | Gu et al. | |

* cited by examiner

Primary Examiner—Wendy R. Garber
Assistant Examiner—Timothy J. Henn
(74) Attorney, Agent, or Firm—Frommer Lawrence & Haug LLP; William S. Frommer (57) ABSTRACT

An auto-focus apparatus, a focus adjusting method, an image capturing apparatus and an image capturing method make it possible to perform accurate focus adjustment on a subject for which the focus should be adjusted. The auto-focus apparatus emits an irradiation wave from emitting means for irradiation to a subject while changing an incident angle of the irradiation wave, detects an incident angle of a reflected wave of the irradiation wave reflected by the subject, incident on light receiving means positioned correspondingly to the emitting means, determines based on the emitting angle and the incident angle whether or not the subject is a subject for which the focus is adjusted, and adjusts the focus on the subject when determining that the subject is the subject for which the focus should be adjusted, thereby making it possible to accurately adjust the focus on the subject for which the focus should be adjusted.

12 Claims, 6 Drawing Sheets

AUTO-FOCUS APPARATUS, FOCUS ADJUSTING METHOD, IMAGE CAPTURING APPARATUS AND IMAGE CAPTURING METHOD UTILIZING AN EMITTING DEVICE TO FOCUS AN IMAGE

BACKGROUND OF THE INVENTION

1. Field of the Invention

The present invention relates to an auto-focus apparatus, a focus adjusting method, an image capturing apparatus and an image capturing method, and more particularly, is suitably applied, for example, to a video camera.

2. Description of the Related Art

Conventionally, video cameras contain a so-called auto-focus function which automatically performs a focusing operation of a lens in accordance with the distance to a subject (subject distance). For realizing such an auto-focus function, a variety of focus detecting methods have been devised for detecting a defocused state, and among others, an image processing method, an infrared method and a phase difference detecting method are representative.

The image processing method picks up a central region from an image captured by an imaging device (CCD: Charge Coupled Device), extracts high frequency components from the picked-up region, and adds the high frequency components to generate a value which is used as an evaluation value for detecting the focus. This evaluation value becomes higher as an image of a subject being captured approaches a focused state, and becomes lower as the image is further away from the focused state after it presents the highest value at the position of the focused state. Therefore, the image processing method moves the focus to examine whether the evaluation value increases or decreases, and adjusts the focus while moving the focus in a direction in which the evaluation value becomes higher until the focused state is reached. In other words, the image processing method performs a so-called hill climbing operation.

This image processing method is advantageous in that it can realize an auto-focus function without modifying or adding the design of the optical system such as lenses, and can improve the sensitivity to a focus error since the focus is adjusted using an image captured by the CCD.

Next, the infrared method applies the principles of triangulation to calculate the subject distance. Specifically, the infrared method irradiates an infrared ray from a video camera to a subject, detects an incident angle of return light reflected by the subject and returning to the video camera, and then calculates the subject distance based on the detected incident angle of the return light. The infrared method is advantageous in that the subject distance can be sufficiently measured, even if the subject is dark, as long as the amount of return light from the subject exceeds a predetermined amount, since the infrared ray emitted from the video camera itself is irradiated to the subject.

Further, the phase difference detecting method provides two sets of lens groups, each comprised of a small lens and a line sensor for detecting the position of light, in a lens optical system of a camera, and disposes the two sets of lens groups with their optical axes shifted from each other to realize the aforementioned triangulation. This phase difference detecting method is advantageous in that the capability of detecting a focusing state is constant irrespective of the subject distance.

The aforementioned image processing method, however, cannot detect a focusing stage unless the focus is moved to examine a change in evaluation value. Also, since the evaluation value varies in response to a small movement of a subject in the vertical direction with respect to the optical axis, the focused position can be erroneously detected. Therefore, the image processing method experiences difficulties in making the focus smoothly follow movements of the subject in the direction of the optical axis.

As a solution for the problems of the image processing method, the infrared method and the phase difference detecting method have been proposed. Since these methods can reveal a focusing state without moving the focus, they need not move the focus to examine the focusing state. In addition, even if a subject moves in the vertical direction with respect to the optical axis, these methods will never erroneously measure the subject distance. However, because of its limited ability of measuring a distance of only about 10 m or less, the infrared method is not suitable for a business-use video camera which may capture a subject, for example, at a distance exceeding 10 m with a small depth of field (a range centered on the subject in which the subject is in focus).

Also, in the infrared method, since an optical system for emitting an infrared ray is generally disposed external to a video camera, the optical axis of the video camera cannot be aligned with the optical axis of the infrared ray, causing a problem of discrepancy between an actual screen range and a range viewed in a view finder, i.e., parallax.

Figure 1:
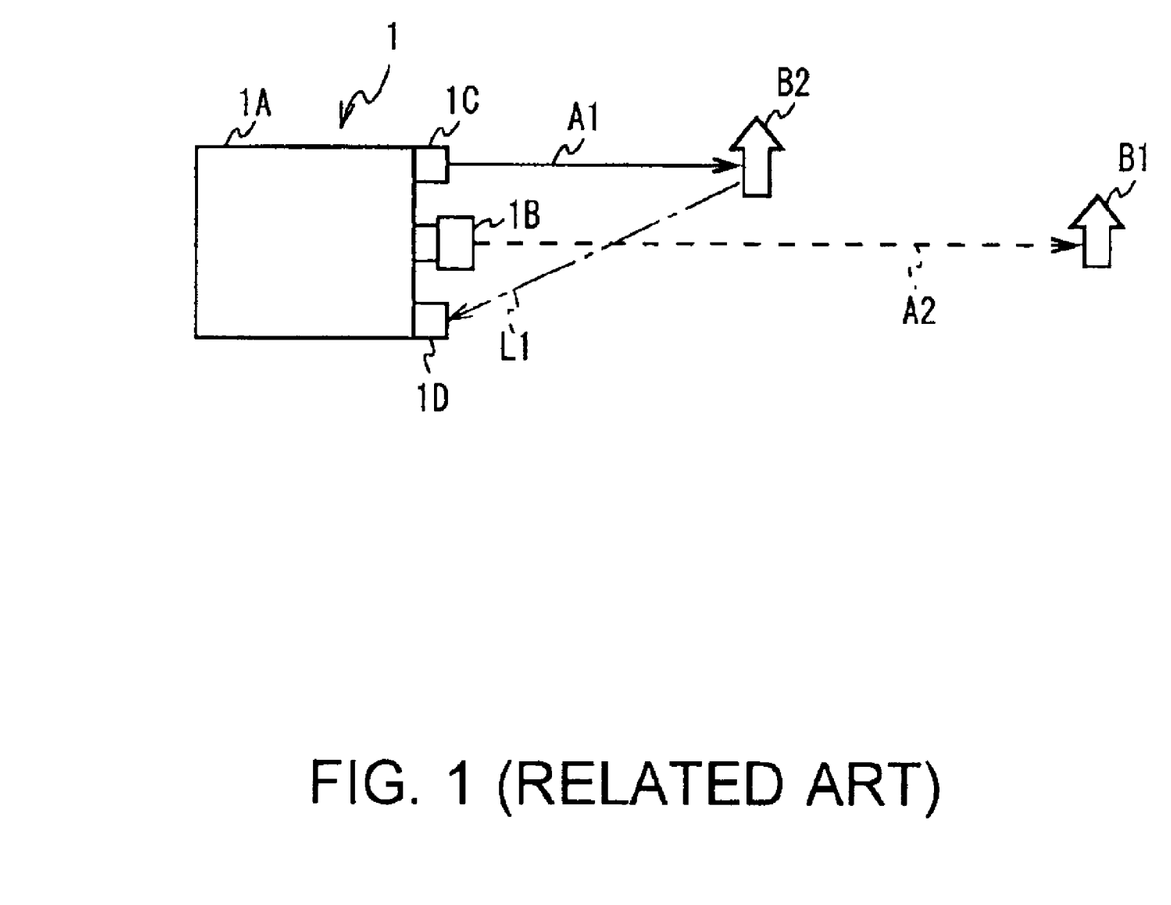
FIG. 1 is a schematic diagram used for explaining the principles as to how parallax occurs.

FIG. 1 shows the principles as to how the parallax occurs. As shown in FIG. 1, a video camera 1 comprises a camera body 1A, and a camera lens 1B, an infrared ray emitter 1C and a return light incident angle detector 1D mounted on the camera body 1A, and applies the principles of triangulation to measure the subject distance.

Since the camera lens 1B is spaced from the infrared ray generator 1C by a predetermined distance, the optical axis A1 of an infrared ray is not coaxial with the optical axis A2 of the camera. In the video camera 1, since the optical axis A1 of the infrared ray is offset from the optical axis A2 of the camera in this way, even if a subject B1 to be captured is located on the optical axis A2 of the camera, the infrared ray may be irradiated to a subject B2 which is located on an axis offset from the optical axis A2 of the camera, i.e., on the optical axis A1 of the infrared ray.

In this event, the video camera 1 detects return light L1 from the subject B2, which is not to be captured, to measure the distance to the subject B2, and fails to measure the distance to the subject B1 to be captured.

The phase difference detecting method, on the other hand, suffers from a lower ability of measuring the subject distance as an iris of a camera lens is reduced. Specifically, since a video camera performs an auto-focus operation and an imaging operation simultaneously, the video camera cannot open the iris in the auto-focus operation and reduces the iris during the imaging operation, as does a still camera which separately performs the auto-focus operation and the imaging operation. Thus, due to the requirement of adjusting the iris during the imaging operation, the video camera cannot avoid a degradation in the ability of measuring the distance to a subject, resulting from the reduced iris.

SUMMARY OF THE INVENTION

In view of the foregoing, an object of this invention is to provide an auto-focus apparatus, a focus adjusting method, an image capturing apparatus and an image capturing method which are capable of accurately adjusting the focus on a subject to be captured.

The foregoing object and other objects of the invention have been achieved by the provision of an auto-focus apparatus, a focus adjusting method, an image capturing apparatus and an image capturing method in which an irradiation wave is emitted from emitting means for irradiation to a subject while changing an incident angle of the irradiation wave, an incident angle of a reflected wave of the irradiation wave reflected by the subject, incident on light receiving means positioned corresponding to the emitting means, is detected, whether or not the subject is a subject for which the focus is adjusted is determined based on the emitting angle and the incident angle, and the focus is adjusted on the subject when determining that the subject is the subject for which the focus should be adjusted, thereby making it possible to accurately adjust the focus on the subject for which the focus should be adjusted.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 2:
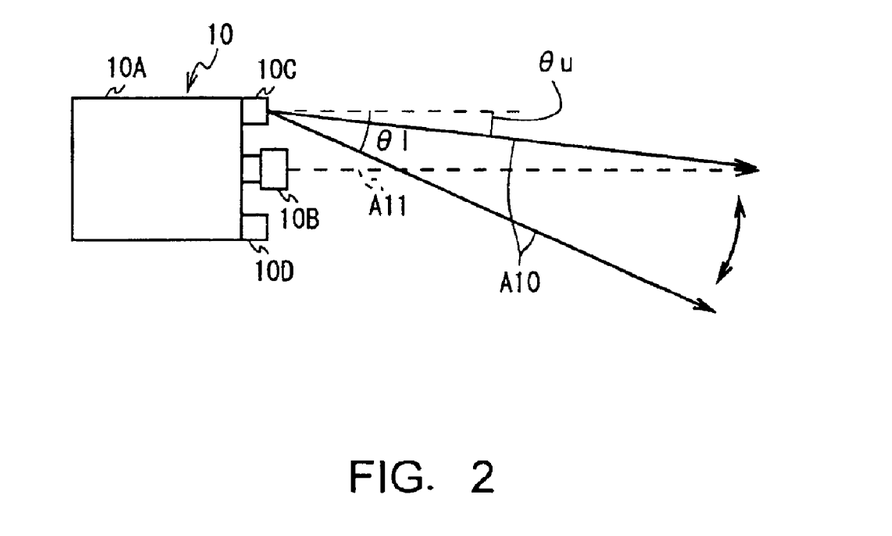
FIG. 2 is a schematic diagram used for explaining a video camera according to the present invention.

Preferred embodiments of this invention will be described with reference to the accompanying drawings:

FIG. 2 illustrates the configuration of a video camera, generally designated by reference numeral 10, which comprises a camera body 10A, and a camera lens 10B, an infrared ray emitter 10C as emitting means, and a return light incident angle detector 10D as incident light detecting means mounted at predetermined positions of the camera body 10A. The video camera employs the infrared method as a focus detecting method, and applies the principles of triangulation to measure the distance from the camera lens 10B to a subject, i.e., the subject distance.

In this embodiment, for measuring the subject distance, the infrared ray emitter 10C can vary (scan) the optical axis A10 of an infrared ray, i.e., the orientation of the infrared ray over an emitting angle in a range of θ1 to θu in the vertical direction.

In this event, an infrared ray scanning period is set, for example, to 1/60 seconds, so that the infrared ray emitter 10C scans in a range of the emitting angle from θ1 to θu once for every 1/60 seconds. Also, the infrared ray emitter 10C irradiates the infrared ray at a position on the optical axis A11 of the camera spaced by a distance 0.8 m from the camera lens 10B when the infrared ray is emitted at angle θ1 , and irradiates the infrared ray at a position on the optical axis A11 of the camera spaced by a distance 30 m from the camera lens 10B when the infrared ray is emitted at angle θu. In this way, the infrared ray emitter 10C can irradiate the infrared ray to a subject which is located on the optical axis A11 of the camera and distanced from the camera lens 10B in a range of 0.8 to 30 m.

Figure 3:
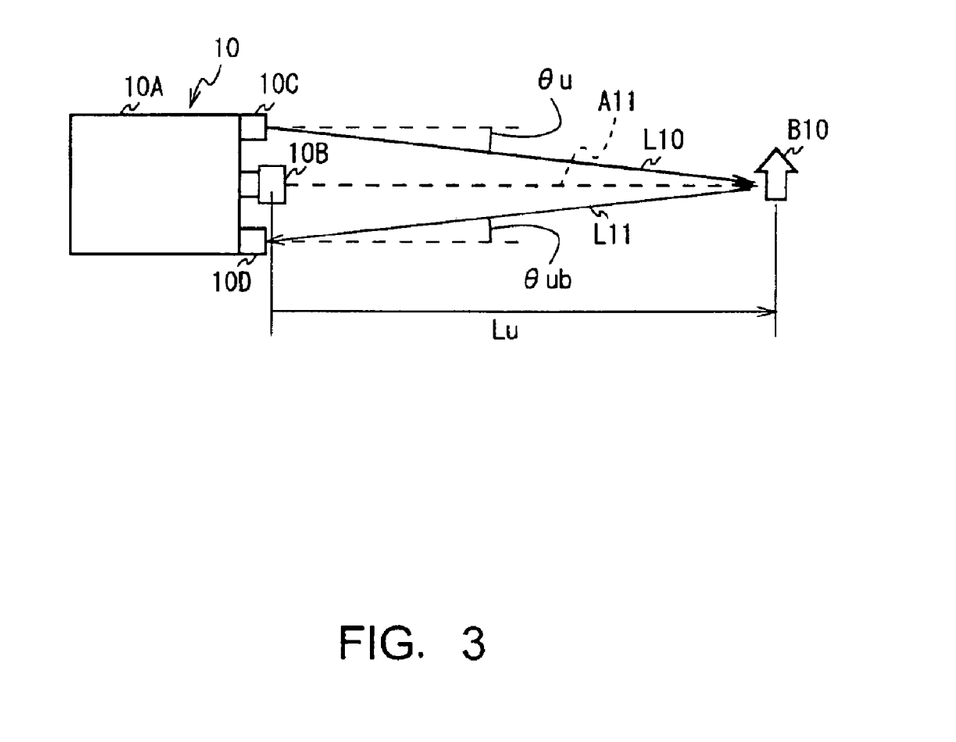
FIG. 3 is a schematic diagram used for explaining how the distance to a subject is measured.

FIG. 3 shows how to measure the subject distance when a subject B10 is located on the optical axis A11 of the camera. In this event, the infrared ray emitter 10C irradiates an infrared ray L10 to the subject B10 at an emitting angle θu. The infrared ray L10 is reflected by the subject B10, and return light L11 from the subject B10 is incident on the return light incident angle detector 10D at an incident angle θub.

When the subject B10 is located on the optical axis A11 of the camera as described above, the subject distance is uniquely determined when the incident angle θub of the return light is determined. Therefore, the return light incident angle detector 10D measures the incident angle θub of the return light L11 to calculate the subject distance Lu based on the incident angle θub and the distance between the camera lens 10B and the return light incident angle detector 10D. Then, the video camera 10 adjusts the focus in accordance with the thus calculated subject distance Lu.

Figure 4:
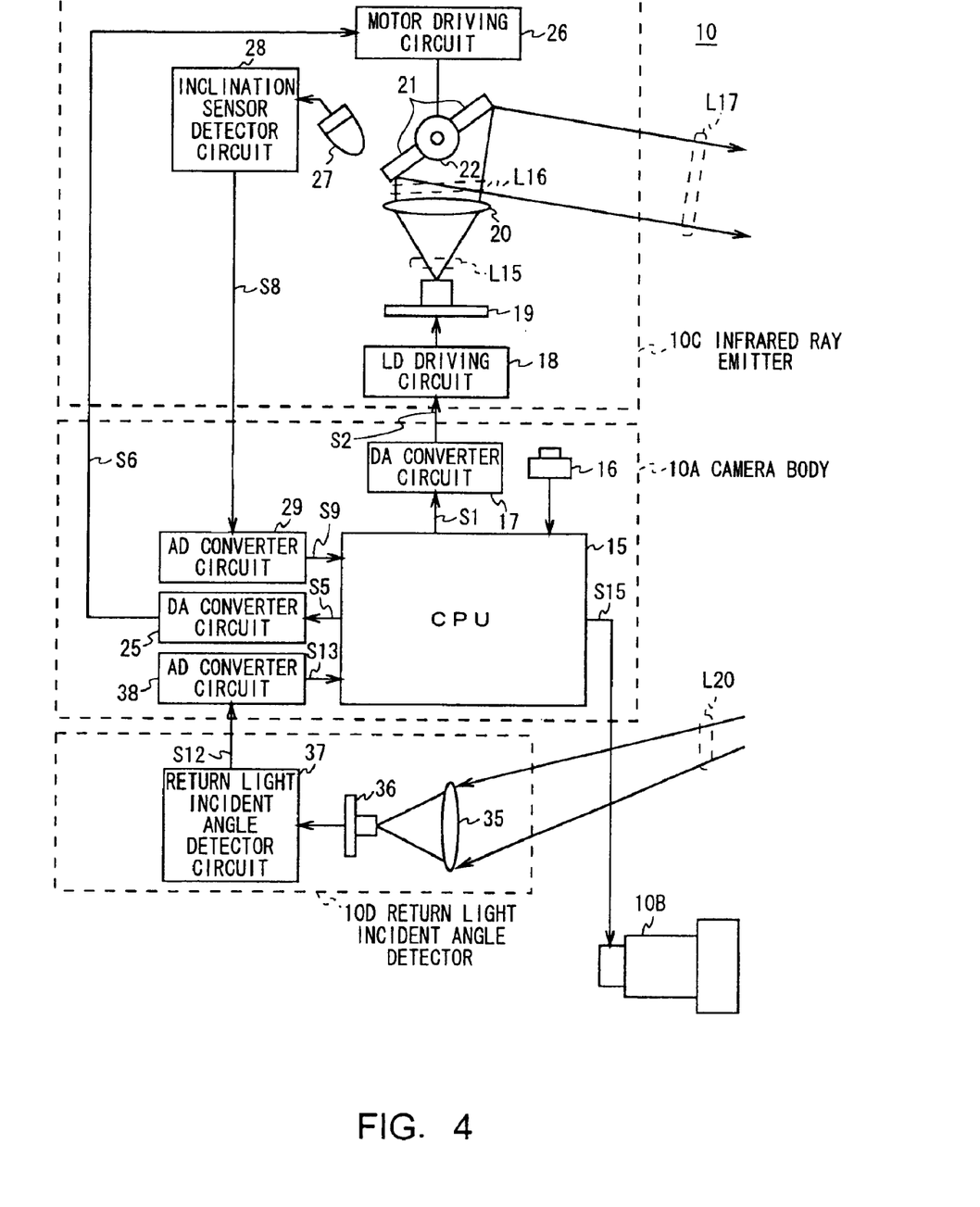
FIG. 4 is a block diagram illustrating the circuit configuration of the video camera.

Here, the circuit configuration of the video camera 10 is illustrated in FIG. 4. A Central Processing Unit (CPU) 15 is mounted in the camera body 10A to control the general operation of the video camera 10. The CPU 15 periodically (for example, every 30 msec) checks whether a push switch 16, disposed external to the video camera 10, is pressed, and generates instruction data S1 for emitting an infrared ray when it detects that the push switch 16 is pressed.

The CPU 15 sends the instruction data S1 to a digital-to-analog (DA) converter circuit 17 which converts the instruction data S1 to an analog instruction signal S2 which is then sent to an Laser Diode (LD) driving circuit 18 in the infrared ray emitter 10C. The LD driving circuit 18, in response to the instruction signal S2, drives an LD 19 as a light emitting element, and applies the LD 19 with a current. Then, the LD 19 emits laser light L15 in accordance with the applied current.

The laser light L15 emitted from the LD 19 is transformed to a diverting beam L16 having a diverting angle proximal to a parallel beam by a lens 20, reflected by a mirror 21 comprised of a flat mirror, and irradiated to the space as an infrared ray L17.

In this embodiment, the infrared ray emitter 10C employs, as a light emitting element, the LD 19, referred to as an eye safe laser diode, which is highly safe to eyes and oscillates in a 1400 nm band of wavelength, and irradiates the laser light L15 with large power exceeding 200 mW. The video camera 10, therefore, ensures the safety to the eyes of the user, as well as can extend a measurable distance to 30 m, i.e., approximately three times the conventional light emitting diode which is measurable up to approximately 10 m with power of 20 mW, by way of example.

The CPU 15, upon detection of the pressed push switch 16, also generates driving data S5 for driving a motor 22 coupled to the mirror 21 in the infrared ray emitter 10C. The CPU 15 sends the driving data S5 to a digital-to-analog (DA)

converter circuit 25 which converts the driving data S5 to an analog driving signal S6 which is then sent to a motor driving circuit 26 in the infrared ray emitter 10C. The motor driving circuit 26 drives the motor 22 based on the driving signal S6 to change the inclination of the mirror 21, thereby allowing an infrared ray L17 to be irradiated to a subject which is located on the optical axis A11 of the camera (FIG. 2) at a distance of 0.8 to 30 m from the camera lens 10B.

An inclination sensor 27 is provided near the mirror 21, such that an inclination sensor detector circuit 28 detects the inclination of the mirror 21 through the inclination sensor 27 to generate a mirror inclination signal S8. Then, the inclination sensor detector circuit 28 sends the mirror inclination signal S8 to an analog-to-digital (AD) converter circuit 29 which converts the mirror inclination signal S8 to digital mirror inclination data S9 which is sent to the CPU 15. Therefore, the CPU 15 can know the inclination of the mirror 21 based on the mirror inclination data S9. In this way, the CUP 15 measures the orientation of the infrared ray L17 emitted from the infrared ray emitter 10C while changing the orientation of the infrared ray L17.

Also, the CPU 15 controls the power of the emitted infrared ray L17 in accordance with a change in the orientation of the infrared ray L17, i.e., a change in the distance from the camera lens 10B to a position to be measured to reduce the power consumption and extend the lifetime of the LD 19. Specifically, for example, the CPU 15 sets the emission power at 200 mW when the infrared ray L17 is irradiated at a distance of 30 m from the camera lens 10B, while sets the emission power at 2 mW when the infrared ray L17 is irradiated at a distance of 3 m from the camera lens 10B, thereby controlling the return light incident on the return light incident angle detector 10D to a constant amount.

The return light L20 from a subject is incident on a lens 35 in the return light incident angle detector 10D, and is converged by the lens 35 on a light receiving surface of a Position Sensitive Diode (PSD) 36 as position detecting element. The PSD 36 generates a current in accordance with the centroid of the magnitude of the return light L20 converged on the light receiving surface, and sends the current to the return light incident angle detector 37.

The PSD 36 has the light receiving surface in alignment with the focal plane of the lens 35, so that the incident angle of the return light L20 is uniquely determined when the position of the return light L20 converged on the light receiving surface of the PSD 36 is determined. Therefore, the return light incident angle detector circuit 37, serving as detecting means, detects the incident angle of the return light L20 based on the current supplied from the PSD 36. Then, the return light incident angle detector circuit 37 sends the detected incident angle of the return light L20 to an analog-to-digital (AD) converter circuit 38 of the camera body 10A as a return light incident angle signal S12. The AD converter circuit 38 converts the return light incident angle signal S12 to digital return light incident angle data S13 which is sent to the CPU 15.

The CPU 15 calculates the subject distance based on the emitting angle of the infrared ray L17 derived from the mirror inclination data S9 and the incident angle of the incident angle L20 derived from the return light incident angle data S13, and sends the subject distance to the camera lens 10B as subject distance data S15 to adjust the focus such that the focus of the camera lens 10B is coincident with the subject distance. For reference, the CPU 15 sends the subject distance data S15 to the camera lens 10B every 1/60 seconds to make the focus smoothly follow movements of the subject.

Figure 5:
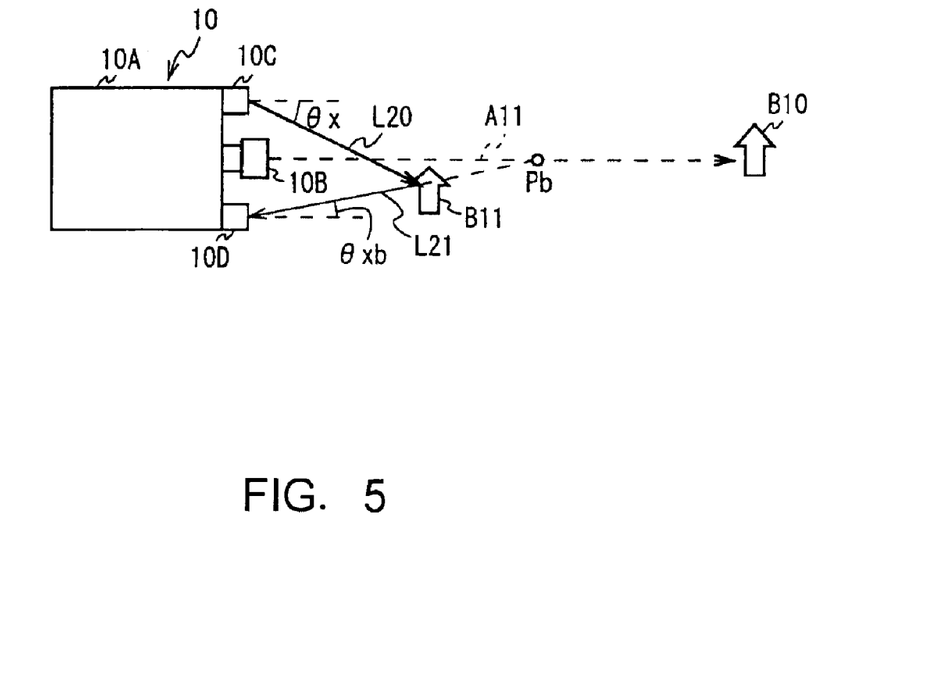
FIG. 5 is a schematic diagram used for explaining how the distance to a subject is measured.

Here, FIG. 5 shows a situation in which a subject B10 to be imaged is located on the optical axis A11 of the camera, and a subject B11 not to be imaged is located at a position apart from the optical axis A11 of the camera, wherein an infrared ray L20 is irradiated to the subject B11 not to be imaged while the infrared ray L20 is being scanned.

In this situation, return light L21 reflected by the subject B11 is incident on the return light incident angle detector 10D at an incident angle θxb. In this event, a conventional video camera calculates a subject distance based only on the incident angle θxb of the return light L21. As a result, the video camera disadvantageously determines that the subject exists at a position of a point Pb on the optical axis A11 of the camera, and focuses at the position of the point Pb on the optical axis A11 of the camera.

To eliminate this disadvantage, the CPU 15 (FIG. 4) of the video camera 10 previously holds in an internal memory incident/emitting relation data (FIG. 6) indicative of the relationship between the emitting angle of the infrared ray and the incident angle of return light when a subject exists on the optical axis A11 of the camera, and determines whether or not the detected emitting angle of the infrared ray and incident angle of the return light match the incident/emitting relation data.

Figure 6:
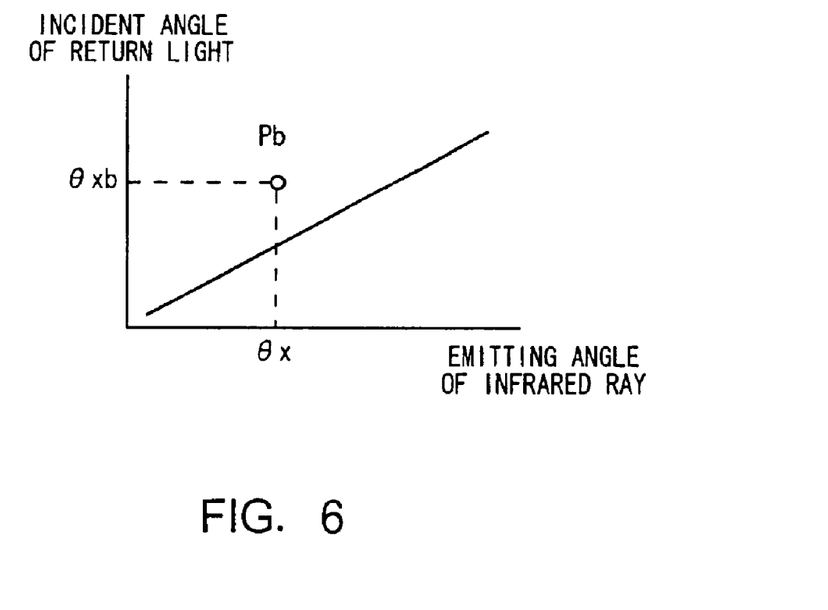
FIG. 6 is a schematic diagram showing the relationship between an emitting angle of an infrared ray and an incident angle of return light.

As a result, when determining that the detected emitting angle of the infrared ray and incident angle of the return light match the incident/emitting relation data, the CPU 15 determines that the subject exists on the optical axis A11 of the camera, and calculates the distance to the subject. On the other hand, when determining that the detected emitting angle of the infrared ray and incident angle of the return light do not match the incident/emitting relation data, the CPU 15 determines that the subject does not exist on the optical axis A11 of the camera, and that the subject is not to be imaged.

Figure 7:
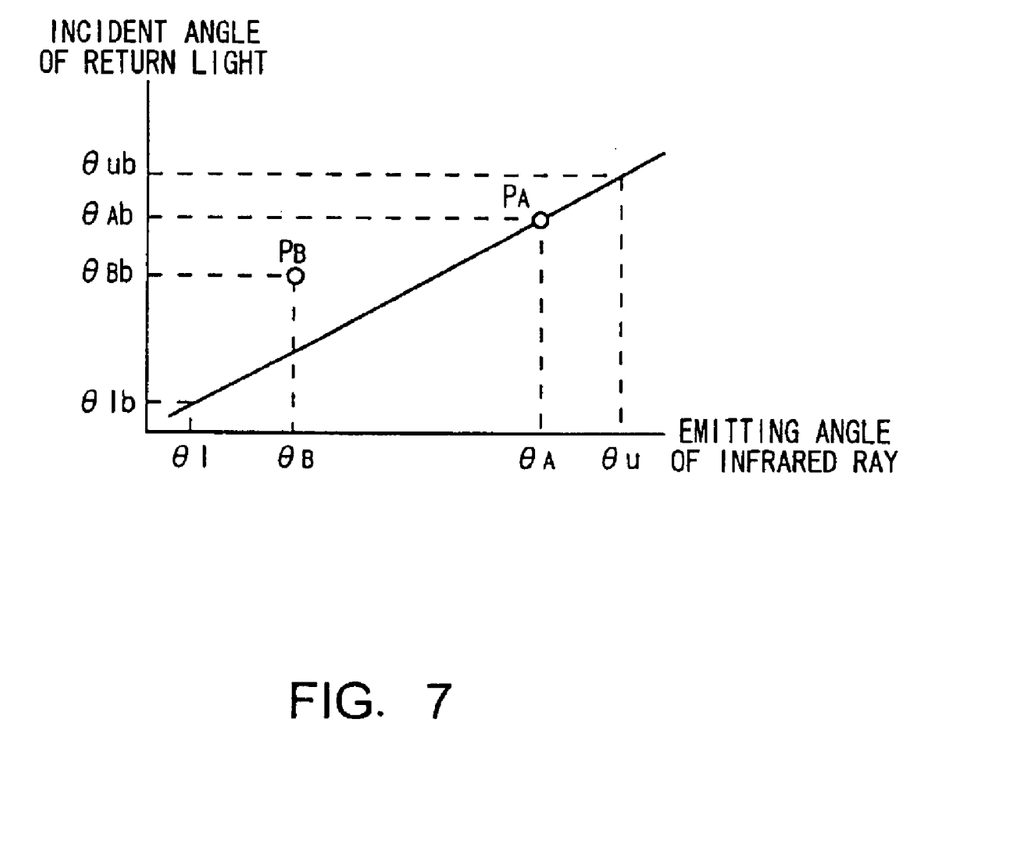
FIG. 7 is a schematic diagram showing the relationship between an emitting angle of an infrared ray and an incident angle of return light.

For example, in FIG. 5, when the video camera 10 changes the emitting angle of the infrared ray L20, the infrared ray L20 is first irradiated to the subject B11, and next to the subject B10. In this event, the return light incident angle detector 10D receives return light L21 from the subject B11 to detect an incident angle θBb, and next receives return light from the subject B10 to detect an incident angle θAb, as shown in FIG. 7.

Thus, the CPU 15 (FIG. 4) is provided with position data PB (θB, θBb) of the subject B11 and position data PA (θA, θAb) of the subject B10, and determines based on the aforementioned incident/emitting relation data that only the subject B10 is located on the optical axis A11 of the camera. Eventually, the CPU 15 determines the subject B10 as a subject to be imaged, and calculates the distance to the subject B10 to adjust the focus.

As described above, in FIG. 8, the CPU 15, when entering a focus adjustment processing procedure RT1, proceeds to step SP1 to initiate every 1/60 seconds, and determines whether or not the push switch 16 is pressed at subsequent step SP2.

Figure 8:
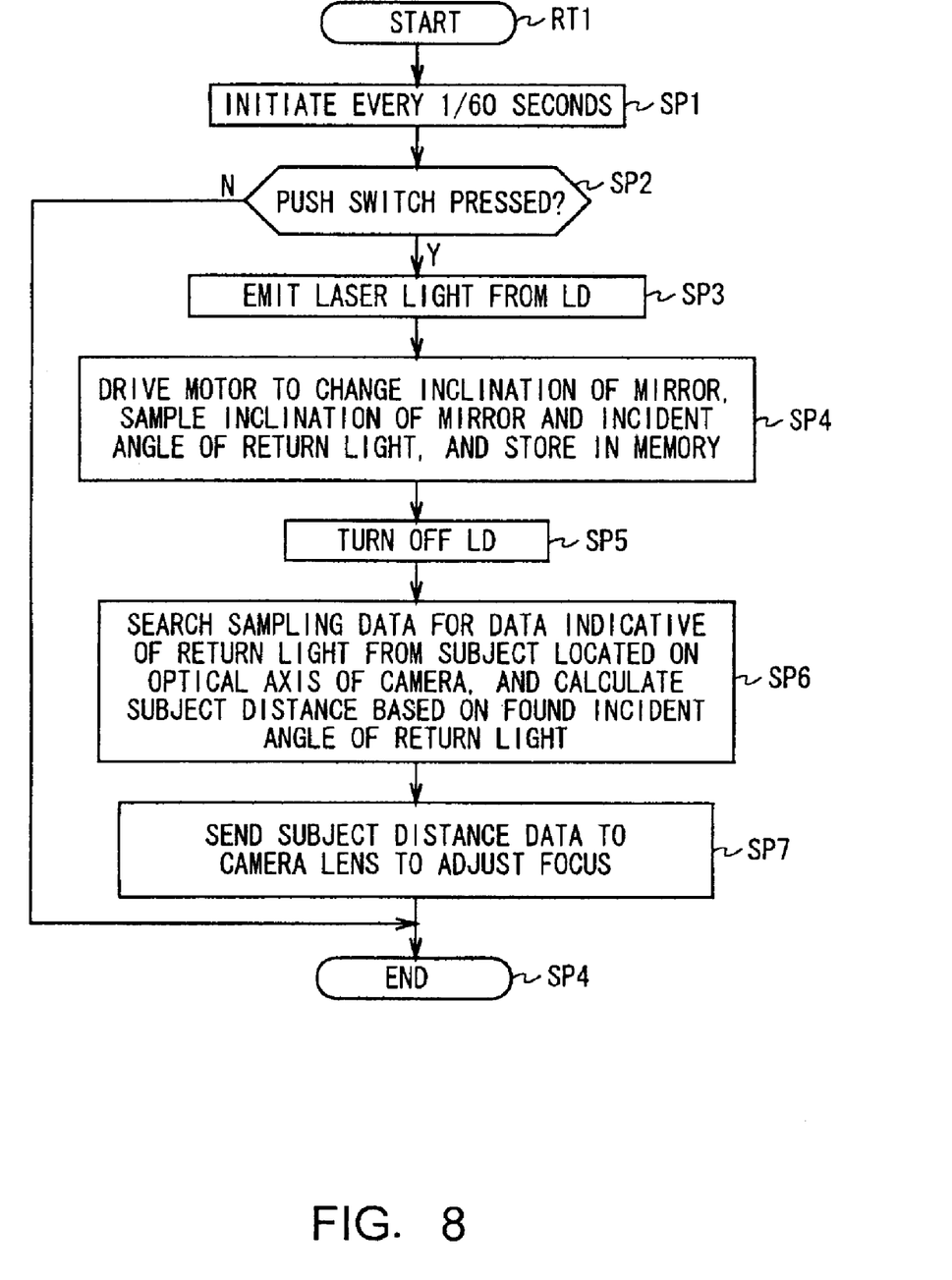
FIG. 8 is a flow chart illustrating a focus adjustment processing procedure.

When an affirmative result is returned at step SP2, this means that the push switch 16 is pressed by the user, in which case, the CPU 15 proceeds to step SP3, where the CPU 15 forces the LD 19 to emit laser light L15. Conversely, when a negative result is returned at step SP12, this means that the push switch 16 is not pressed by the user, in which case, the CPU 15 proceeds to step SP4 to terminate the processing procedure.

Then, the CPU 15 proceeds to step SP4, where the CPU 15 drives the motor 22 through the motor driving circuit 26 to change the inclination of the mirror 21 to change the orientation of the infrared ray, and periodically samples the inclination of the mirror 21 derived from the infrared ray emitter 10C and the incident angle of return light derived from the return light incident angle detector 10D to store in the internal memory sampling data comprised of the emitting angle of the infrared ray indicated by the inclination of the mirror 21 and the incident angle of the return light thus derived.

Then, the CPU 15 turns off the LD 19 at step SP5, and proceeds to step SP6, where the CPU 15 acts as determining means to search the sampling data for one indicative of return light from a subject located on the optical axis A11 of the camera, and to calculate the subject distance based on the incident angle of the found return light.

Next, the CPU 15 acts as adjusting means at step SP7, where the CPU 15 notifies the camera lens 10B of the calculated subject distance to adjust the focus such that the focus of the camera lens 10B matches the subject distance. Subsequently, the CPU 15 proceeds to step SP4 to terminate the processing procedure.

In the foregoing configuration, the infrared ray emitter 10C changes the emitting angle of the infrared ray under the control of the CPU 15 to emit the infrared ray, detects the emitting angle, and notifies the CPU 15 of the detected emitting angle. The infrared ray emitted from the infrared ray emitter 10C is reflected by a subject and incident on the return light incident angle detector 10D. The return light incident angle detector 10D detects the incident angle of the return light from the subject, and notifies the CPU 15 of the detected incident angle.

The CPU 15 determines based on the emitting angle of the infrared and the incident angle of the return light, detected when the infrared ray is irradiated to the subject, whether or not the subject exists on the optical axis A11 of the camera, and calculates the subject distance based on the incident angle of the return light from the subject when determining that the subject exists on the optical axis A11 of the camera. Then, the CPU 15 adjust the focus of the camera lens 10B using the calculated subject distance.

Consequently, the video camera 10 prevents the calculation of the subject distance based on the incident angle of return light reflected by and returned from a subject which does not exist on the optical axis A11 of the camera, i.e., a subject not to be imaged.

According to the foregoing configuration, the infrared ray is emitted as the emitting angle thereof is changed, and it is determined based on the emitting angle of an infrared ray and an incident light of its return light, which are detected when the infrared ray is irradiated to a subject, whether or not the subject exists on the optical axis of the camera before the subject distance is calculated, thereby making it possible to accurately calculate the subject distance and accomplish more accurate focus adjustments as compared with the prior art.

While the foregoing embodiment has been described in connection with a flat mirror which is employed as the mirror 21 for changing the emitting angle of the infrared ray, the present invention is not limited to this particular mirror, but can employ a mirror in any of other various shapes, such as a polygon mirror, by way of example.

Also, while the foregoing embodiment has been described in connection with the PSD 36 employed as the position detecting element, the present invention is not limited to this particular element, but can employ any of other various position detecting elements such as a bisect pin photodiode, by way of example.

Further, while the foregoing embodiment has been described for a specific configuration in which the infrared ray is emitted as its orientation is changed, the present invention is not limited to this configuration. Alternatively, a plurality of infrared ray emitters for emitting infrared rays in different orientations from one another can be provided such that desired one is selected and lit from the plurality of infrared ray emitters as required.

Further, while the foregoing embodiment has been described for a specific configuration in which an infrared ray is irradiated to a subject to calculate the subject distance, the present invention is not limited to this configuration. Alternatively, any of other various irradiation waves such as ultrasonic waves, by way of example, can be irradiated to a subject to calculate the subject distance.

Further, while the foregoing embodiment has been described in connection with the video camera 10 to which the present invention is applied, the present invention is not limited to the video camera but can be applied widely to a variety of other auto-focus apparatus which contain an auto-focus function such as a still camera for photographing a still image, by way of example.

As described above, according to the present invention, the auto-focus apparatus irradiates an irradiation wave from emitting means to a subject while changing an emitting angle of the irradiation wave, detects an incident angle of a reflected wave of the irradiation wave reflected by the subject, incident on light receiving means positioned corresponding to the emitting means, determines based on the emitting angle and the incident angle whether or not the subject is a subject for which the focus should be adjusted, and adjusts the focus on the subject when determining that the subject is the subject for which the focus should be adjusted, thereby making it possible to accurately adjust the focus on the subject for which the focus should be adjusted.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An auto-focus apparatus comprising:
    emitting means for emitting an irradiation wave for irradiation to a subject while changing an emitting angle of said irradiation wave;
    detecting means for detecting an incident angle of a reflected wave of said irradiation wave reflected by said subject, incident on light receiving means positioned corresponding to said emitting means;
    determining means for determining based on said emitting angle and said incident angle whether or not said subject is a subject for which the focus should be adjusted; and
    adjusting means for adjusting the focus on said subject when determining that said subject is the subject for which the focus should be adjusted, wherein
    said determining means comprises a storage means for storing sampling data of said emitting angle and said incident angle, and
    wherein said determining means comprises a storage means for storing correspondence data of said emitting angle and said corresponding incident angle.

2. The auto-focus apparatus according to claim 1, wherein said emitting means emits an infrared ray emitted from an eye safe laser diode.

3. The auto-focus apparatus according to claim 1, wherein said emitting means controls emission power of said irradiation wave in accordance with a change in the emitting angle of said irradiation wave.

4. A focus adjusting method comprising the steps of:
   emitting an irradiation wave from irradiating means for irradiation to a subject while changing an emitting angle of said irradiation wave;
   detecting an incident angle of a reflected wave of said irradiation wave reflected by said subject, incident on light receiving means positioned corresponding to said emitting means;
   determining based on said emitting angle and said incident angle whether or not said subject is a subject for which the focus should be adjusted; and
   adjusting the focus on said subject when determining that said subject is the subject for which the focus should be adjusted,
   wherein said determination is made based upon stored sampling data of said emitting angle and said incident angle, and
   wherein in said determination, said sampling data is selected based upon stored correspondence data of said emitting angle and said corresponding incident angle.

5. The focus adjusting method according to claim 4, wherein said emitting means emits an infrared ray emitted from an eye safe laser diode.

6. The focus adjusting method according to claim 4, wherein said emitting means controls emission power of said irradiation wave in accordance with a change in the emitting angle of said irradiation wave.

7. An image capturing apparatus comprising:
   emitting means for emitting an irradiation wave for irradiation to a subject while changing an emitting angle of said irradiation wave;
   detecting means for detecting an incident angle of a reflected wave of said irradiation wave reflected by said subject, incident on light receiving means positioned corresponding to said emitting means;
   determining means for determining based on said emitting angle and said incident angle whether or not said subject is a subject for which the focus should be adjusted; and
   adjusting means for adjusting the focus on said subject when determining that said subject is the subject for which the focus should be adjusted, wherein said determining means comprises a storage means for storing sampling data of said emitting angle and said incident angle, and
   wherein said determining means comprises a storage means for storing correspondence data of said emitting angle and said corresponding incident angle.

8. The image capturing apparatus according to claim 7, wherein said emitting means emits an infrared ray emitted from an eye safe laser diode.

9. The image capturing apparatus according to claim 7, wherein said emitting means controls emission power of said irradiation wave in accordance with a change in the emitting angle of said irradiation wave.

10. An image capturing method comprising the steps of:
    emitting an irradiation wave from irradiating means for irradiation to a subject while changing an emitting angle of said irradiation wave;
    detecting an incident angle of a reflected wave of said irradiation wave reflected by said subject, incident on light receiving means positioned corresponding to said emitting means;
    determining based on said emitting angle and said incident angle whether or not said subject is a subject for which the focus should be adjusted; and
    adjusting the focus on said subject when determining that said subject is the subject for which the focus should be adjusted, wherein said determination is made based upon stored sampling data of said emitting angle and said incident angle, and
    wherein in said determination, said sampling data is selected based upon stored correspondence data of said emitting angle and said corresponding incident angle.

11. The image capturing method according to claim 10, wherein said emitting means emits an infrared ray emitted from an eye safe laser diode.

12. The image capturing method according to claim 10, wherein said emitting means controls emission power of said irradiation wave in accordance with a change in the emitting angle of said irradiation wave.

* * * * *